United States Patent [19]
Delavaux et al.

[11] Patent Number: 5,608,562
[45] Date of Patent: Mar. 4, 1997

[54] OPTICAL COMMUNICATIONS SYSTEM WITH ADJUSTABLE DISPERSION COMPENSATION

[75] Inventors: Jean-Marc P. Delavaux, Wescosville; Kinichiro Ogawa, Lower Macungie Township; Paul D. Yeates, Longswamp Township, all of Pa.

[73] Assignee: Lucent Technologies Inc., Murray Hill, N.J.

[21] Appl. No.: 522,802

[22] Filed: Sep. 1, 1995

Related U.S. Application Data

[63] Continuation of Ser. No. 248,773, May 25, 1994, abandoned.

[51] Int. Cl.⁶ .................................................. H04B 10/00
[52] U.S. Cl. ................................. 359/161; 359/173
[58] Field of Search ................................. 359/161, 173, 359/179, 189, 195, 124, 128; 385/28, 24

[56] References Cited

U.S. PATENT DOCUMENTS

| | | | |
|---|---|---|---|
| 4,750,802 | 6/1988 | Bhagavatula | 385/33 |
| 4,929,710 | 5/1990 | Tick et al. | 350/96.3 |
| 4,953,939 | 9/1990 | Epworth | 350/96.19 |
| 5,042,906 | 8/1991 | Chesler et al. | 385/123 |
| 5,218,662 | 6/1993 | Dugan | 385/123 |
| 5,224,183 | 6/1993 | Dugan | 359/161 |
| 5,261,016 | 11/1993 | Poole | 385/28 |
| 5,343,322 | 8/1994 | Pirio et al. | 359/161 |
| 5,355,240 | 10/1994 | Prigent et al. | 359/161 |

FOREIGN PATENT DOCUMENTS 0030233 1/1990 Japan .................................. 359/161

OTHER PUBLICATIONS

*Electronics Letters*, vol. 29, No. 3, 4 Feb. 1993, pp. 315–317, XP 000336813, Ibrahim H. et al., "Fibre–Equaliser Second Order Distortion Compensation in 1.55 um Lightwave CATV Transmission System".

*Primary Examiner*—Wellington Chin
*Assistant Examiner*—Kinfe-Michael Negash
*Attorney, Agent, or Firm*—Richard D. Laumann

[57] ABSTRACT

An optical communication system uses adjustable dispersion compensating fibers to compensate for dispersion in system fibers. The amount of dispersion introduced by the dispersion compensating fibers is varied depending upon the amount of compensation required. The amount of compensation may be determined automatically and the amount of compensation introduced by the fibers may be adjusted automatically by a controller.

12 Claims, 3 Drawing Sheets

OPTICAL COMMUNICATIONS SYSTEM WITH ADJUSTABLE DISPERSION COMPENSATION

This application is a continuation of application Ser. No. 08/248773, filed on May 25, 1994 now abandoned.

TECHNICAL FIELD

This invention relates generally to the field of optical communications systems with dispersion compensation and particularly to such systems controlling amounts of dispersion compensation and to components of such systems.

BACKGROUND OF THE INVENTION

Optical communications systems using optical fibers to connect a light source and detector or regenerators have reached a high state of technological development with data rates in excess of 10 Gbits/sec and transmission spans of more than a 1000 kilometers possible. A transmission span is the distance between light source and detector or regenerators. The entire transmission distance frequently includes more than one span. One system parameter that has been of interest in attempts to increase system capacity is chromatic dispersion. The presence of chromatic dispersion means that light at different wavelengths or frequencies travels at different velocities in the optical fiber.

Chromatic dispersion, even for very brief pulses, can limit either the operating frequency, that is, the data transmission rate, or the transmission span of the system. Although fibers can be fabricated with low dispersion, some dispersion typically remains because the fabrication does not totally eliminate the chromatic dispersion. Accordingly, techniques have been developed to compensate for fiber chromatic dispersion. One dispersion compensation technique passes the signal through a dispersion compensating fiber (DCF) as well as the system fiber. The DCF has a dispersion opposite to that of the system fiber. The DCF is desirably selected, with respect to length and dispersion, so that the total dispersion for the signal passing through the DCF compensates for the dispersion of the signal as it passes through the system fiber.

This approach is used in U.S. Pat. No. 5,218,662 issued Jun. 8, 1993 to Dugan. The patent describes a system having a plurality of transmission spans with a dispersion compensation unit present for each span. Each dispersion compensation unit reduces the dispersion for a single span. This approach was adopted by Dugan because he believed that compensation in the field required large numbers of fibers of different lengths, and was therefore impractical. The system described by Dugan is static; that is, the amount of compensation can not be readily changed and there is no feedback, while the system is operating, between the receiver and the dispersion compensation units about the quality of the received signal.

While the system described may operate well for many applications, it has drawbacks. In particular, in many systems, signals from one transmitter may, at different times, be transmitted over different system fibers requiring different amounts of chromatic dispersion. That is, the system configuration is dynamic and changes in time as system usage changes. The system described can not vary the amount of chromatic dispersion used to compensate for the dispersion in the system fiber. Additionally, the total transmission path can include a plurality of spans, and the system described can not easily compensate for the chromatic dispersion over a plurality of spans but rather considers and compensates for each span individually.

SUMMARY OF THE INVENTION

According to one embodiment of this invention, an optical communication system comprises a transmitter, a receiver, at least a first optical fiber connected to the transmitter and receiver, and a dispersion compensation unit connected to the at least a first optical fiber. The dispersion compensation unit is adjustable so that it introduces a variable amount of dispersion thus making it useful with fibers of different lengths or with fibers having different dispersion properties. In a preferred embodiment, a controller determines the amount of compensation required using information obtained from the receiver. In yet another embodiment of the invention, the system has a plurality of spans and the compensation for each span is adjusted to compensate for the dispersion over the plurality of transmission spans. The individual spans typically have different lengths. The dispersion compensation unit may be used in either transmission or reflection.

Another aspect of the invention is the dispersion compensation unit which has at least two dispersion compensating fibers that have different dispersion, and means for selectively coupling said fibers to the system fiber. The dispersion compensation unit also has means for receiving information from the receiver and determining the desired amount of compensation. This means is conveniently termed a controller.

In a broader aspect of this invention, the dispersion compensation unit is one embodiment of an adjustable compensation unit which may adjust other parameters such as loss or phase.

BRIEF DESCRIPTION OF THE DRAWING

Identical numerals in different figures represent identical elements.

DETAILED DESCRIPTION

Figure 1:
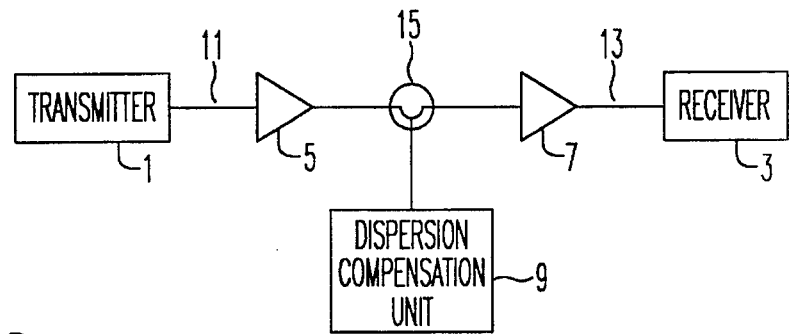
FIGS. 1 and 2 are schematic representations of an optical communications system according to this invention.
Figure 2:
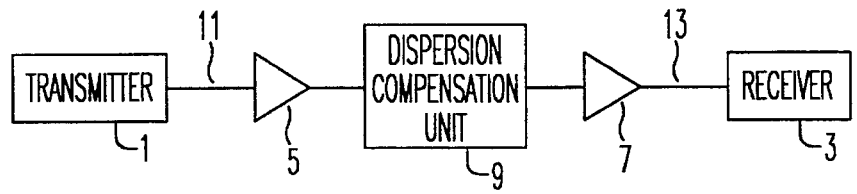

The invention will be described by reference to particular embodiments. One optical communication system according to this invention is schematically depicted in FIG. 1. Shown are transmitter 1 and receiver 3. Between these units are preamplifier 5 and amplifier 7. Dispersion compensation unit 9 is connected to preamplifier 5 and amplifier 7. The preamplifier 5 and amplifier 7 form a signal regenerator. There are optical fibers 11 and 13 between transmitter 1 and preamplifier 5 and between amplifier 7 and receiver 3. The dispersion compensation unit 9 is optically connected to both preamplifier 5 and amplifier 7 through three port optical circulator 15. The dispersion compensation unit is shown being used in reflection; it may also be used in transmission as shown in FIG. 2. Fibers 11 and 13 have characteristics such a dispersion, length, and loss, Unit 9 introduces an amount of dispersion that compensates for the dispersion in fibers 11 and 13. Of course, the elements depicted are not drawn to scale, fibers 11 and 13 will typically be much longer than are the optical paths between preamplifier 5 and the amplifier 7.

The elements depicted, except for the dispersion compensation unit, are well known in the art. The skilled artisan will readily select appropriate elements. The dispersion compensation unit 9 will be further described.

Figure 3:
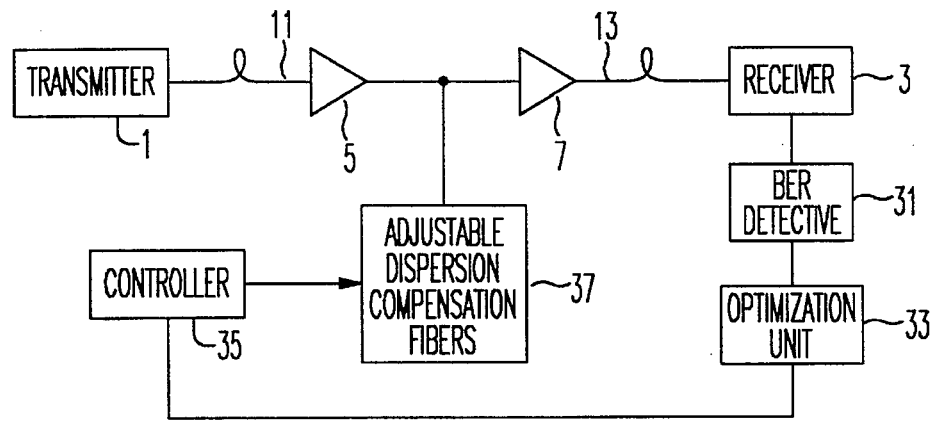
FIGS. 3 and 4 are schematic representations of dispersion compensation units.

Optimization of the dispersion compensation will be better understood by reference to FIG. 3 which shows details of an exemplary dispersion compensation unit. Fibers 11 and 13 have lengths 11 and 12, respectively. In addition to elements already described, present are bit error rate(BER) detector 31 connected to receiver 3, and optimization unit 33 which is connected to the BER detector 31. There is a link, electrical or optical, between the optimization unit 33 and controller 35 which is connected to an adjustable dispersion compensation fibers 37. The fibers 37 are optically connected to fibers 11 and 13. Unit 9 thus includes controller 35 and dispersion compensation fiber 37. Controller 35 receives information from unit 33 and selects the appropriate amount of compensation as will be described later.

Figure 4:
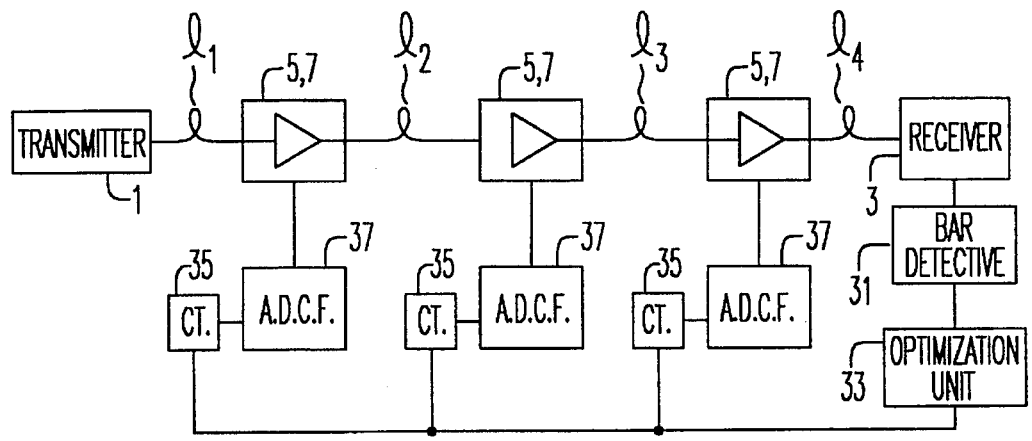

The apparatus depicted is an interactive apparatus in that it optimizes the dispersion compensation based upon an operating parameter such as the eye margin or bit error rate. The operation of the apparatus depicted will be readily understood and implemented by those skilled in the art. The system depicted may be cascaded to include multiple spans with multiple preamplifiers and amplifiers as shown in FIG. 4. For reasons of simplicity of exposition, the amplifiers 7 and preamplifiers 5 are depicted as single units. The fibers have lengths 11, 12, 13, and 14 which typically have four different values. As shown, there is a connection between the receiver 5 and the adjustable dispersion compensation fibers. A plurality of controllers is shown; only a single controller need be used provided that is can individually adjust the adjustable compensation fibers. The amount of compensation at each regenerator will in general not be the same for the total transmission distance of 11+12+13+14 as it would be for a single distance, say 11.

Figure 5:
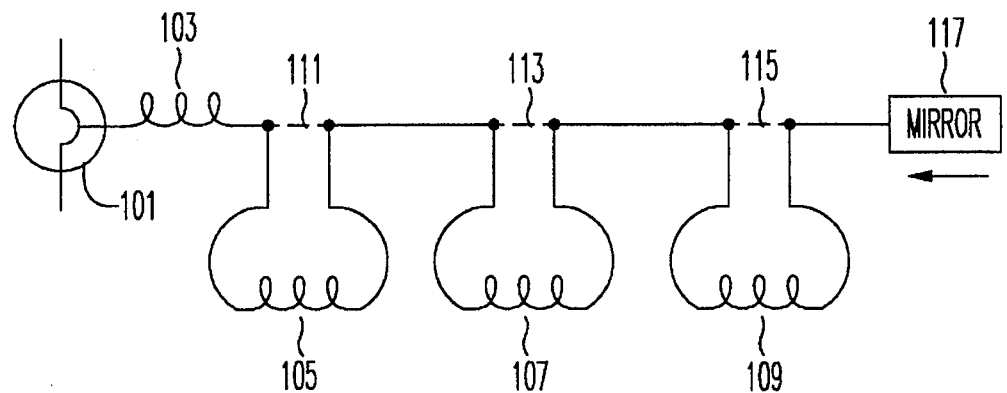
FIGS. 5 and 6 are schematic representations of adjustable dispersion compensation fibers according to this invention.

Operation of unit 9 is better understood from consideration of FIG. 5 which is a schematic representation of adjustable dispersion compensation fiber 35 which is useful in reflection. Depicted are three port optical circulator 101 and a plurality of dispersion compensated fibers 103, 105, 107, and 109. Fiber 103 is connected to circulator 101 and the remaining fibers are connected to the fiber through bypass switches 111, 113, and 115, respectively. There is a mirror 117 for reflecting the signals. The fibers will generally have different lengths and different amounts of dispersion for signals propagating through the fibers. In a preferred embodiment, the amount of compensation introduced by the individual fibers has the ratio 1:2:4:8. Four fibers are shown; more or fewer fibers may be used as desired.

After determining the amount of dispersion compensation required, the bypass switches are set to include or exclude individual fibers so that the desired amount of dispersion compensation may be obtained. The bypass switches may be mechanical, electro-mechanical, etc. Several methods of control are contemplated. The simplest is, of course, manual. Personnel would determine the amount of dispersion compensation required for the fiber span characteristics and manually select the proper dispersion compensation fibers. More sophisticated control uses the embedded digital controller 35 or processor such as that previously described. The processor has access to the fiber parameters including dispersion, length, and loss. In a typical embodiment, there will also be information transfer about the received signal from the receiver to the controller as previously discussed and shown in FIG. 4. The processor determines the amount of compensation required and selects the appropriate dispersion compensating fibers using the switches. It will be readily understood that the amount of compensation implemented need not compensate precisely for the amount of dispersion present.

Figure 6:
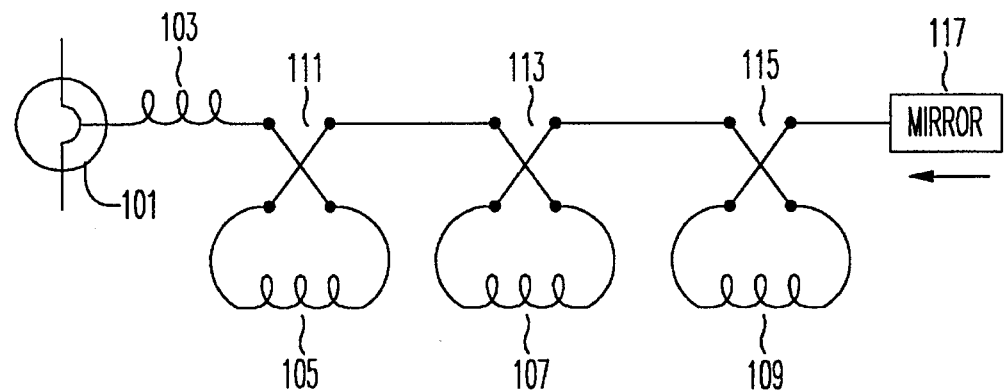

Another embodiment of the dispersion compensation fibers is depicted in FIG. 6. This embodiment is generally similar to that shown in FIG. 5 but cross over switches are used rather than by pass switches. Operation is similar and need not be described in detail.

Figure 7:
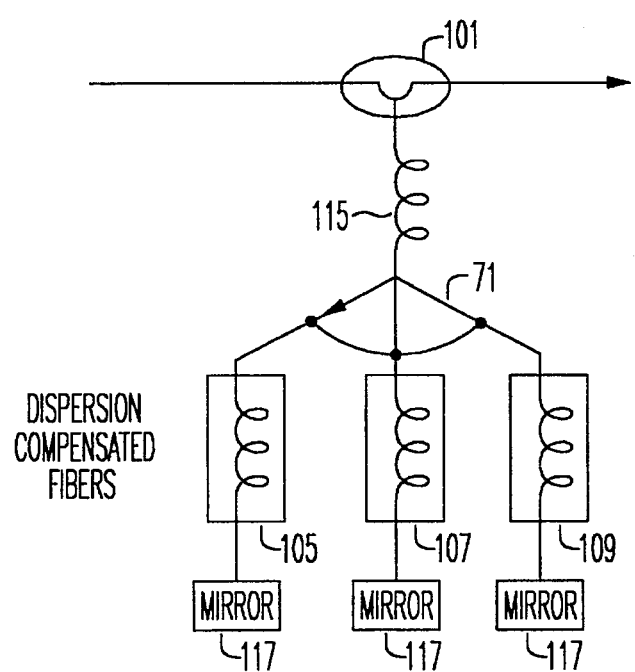
FIGS. 7 and 8 are schematic representations of systems that can compensate for more than a single wavelength.
Figure 8:
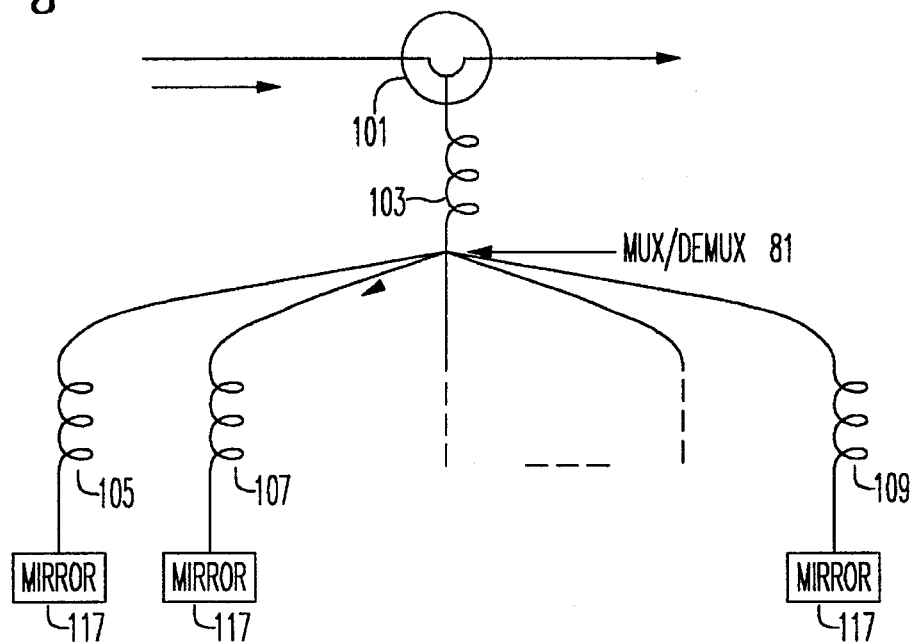

The invention may also be used in systems using at least two wavelengths for information. Embodiments of such systems are schematically depicted in FIGS. 7 and 8. There is a switch 71 that switches the incoming signal to dispersion compensation unit 105, 107, or 109 depending upon the appropriate wavelength. Switch 71 receives information from, for example, the controller about which unit the signal should go to. FIG. 8 depicts a unit that can compensate for several wavelengths simultaneously and is well suited for use in wavelength division multiplexing systems. There is a multiplexer/demultiplexer 81 which directs signals of different wavelengths to different dispersion compensation units 105, 107 and 109. Each unit compensates for the wavelength that it receives. The multiplexer/demultiplexer switches the incoming signal to the appropriate unit. More units, as shown, may be present.

Figure 9:
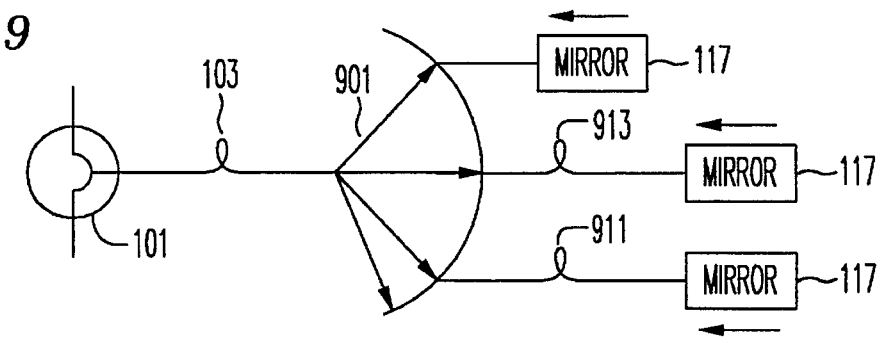
FIGS. 9 and 10 are schematic representations of parallel and series switches.
Figure 10:
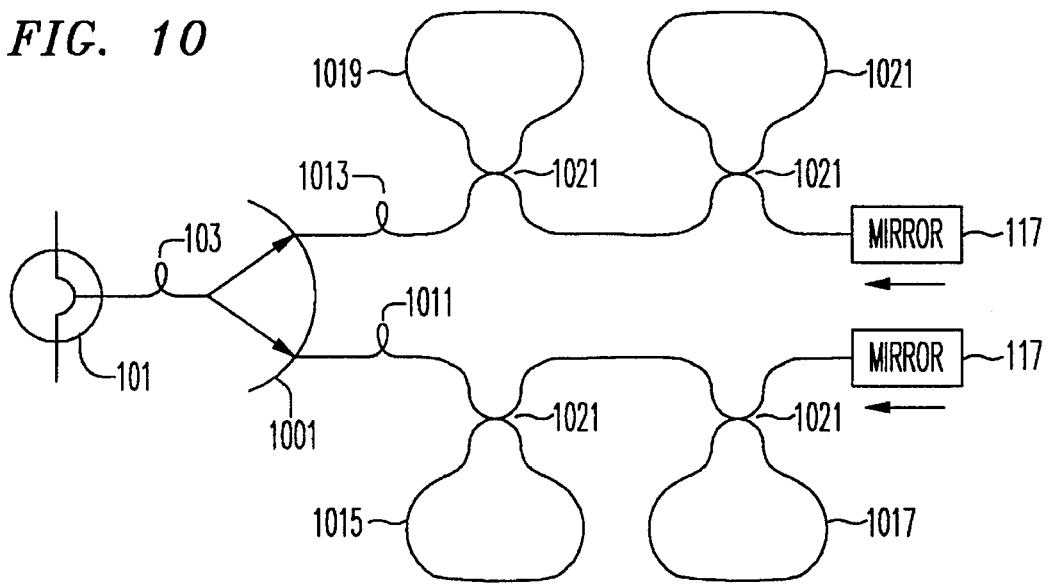

The fibers in the dispersion compensating unit may be connected in series or in parallel or a series/parallel combination. A series arrangement is depicted in FIG. 9 with switch 901 being used to direct signals to the appropriate compensating fiber. The number of switches is reduced compared with the embodiment depicted in FIG. 5 but more hardware is required. Switching loss is reduced but the amount of fiber and the number of mirrors are increased. A combination of series/parallel compensating waveguides is depicted in FIG. 10. Switch 1001 directs the signal to either the upper or lower branch of compensating fibers. Switches 1021 are used to include or exclude the additional fibers in each branch.

Variations in the embodiments depicted will be readily apparent to those skilled in the art. For example, the units shown in FIGS. 5 and 6 may be modified so that they may be used in transmission. Additionally, although the invention has been described with respect to dispersion compensation, it may be used to adjust other system parameters such as loss and phase. The former may be important to regulate amplifier output, and the latter may be desirably used to delay the bit pattern. Although the description has been in terms of dispersion compensation fibers, it should be understood that other dispersion compensating waveguide means may be used and that fibers are only a single example of such waveguide means. Furthermore, although the dispersion compensation unit was described as being connected to a preamplifier and an amplifier located between a transmitter and a receiver and connected to these units with system fibers, the dispersion compensation unit may be located at other points. For example, it may be connected to either the transmitter or to the receiver or regenerator.

We claim:

1. An optical communication system comprising a transmitter, a receiver, first and second optical fibers optically connected to said receiver and said transmitter, respectively, at least two adjustable compensating waveguides, said at least two adjustable compensating waveguides introducing a variable amount of compensation and being optically connected to said first and second fibers; apparatus to switch signals to said two adjustable compensating waveguides; and a controller, said controller being connected to at least one adjustable waveguide of said two adjustable compensating waveguides and determining the compensation of at least one of said two adjustable compensating waveguides.

2. An optical communication system as recited in claim 1 in which said at least two adjustable compensating waveguides vary the amount of dispersion.

3. An optical communications system as recited in claim 1 in which said at least two adjustable compensating waveguides comprise an optical fiber.

4. An optical communications system as recited in claim 3 in which said optical fiber is used in reflection.

5. An optical communications system as recited in claim 3 in which said optical fiber is used in transmission.

6. An optical communications system as recited in claim 1 in which said controller is connected to said receiver and comprises means for receiving information from said receiver.

7. An optical communications system as recited in claim 1 in which said apparatus comprises a multiplexer/demultiplexer connected to said at least said adjustable compensating waveguides.

8. An optical communications system comprising a plurality of systems as recited in claim 1, each of said systems being optically connected to at least one other of said systems.

9. Optical apparatus comprising at least two automatically adjustable compensating waveguides introducing a variable amount of compensation;

a controller, said controller determining the amount of dispersion compensation; and apparatus connected to said at least one of automatically adjustable compensating waveguides for switching signals to said compensating waveguides.

10. Optical apparatus as recited in claim 9 in which said automatically adjustable compensating waveguides comprise at least two optical fibers.

11. Optical apparatus as recited in claim 10 in which said at least two optical fibers have different dispersion.

12. Optical apparatus as recited in claim 10 in which said apparatus comprises a multiplexer/demultiplexer connected to said at least one of said adjustable compensating waveguides.

* * * * *